United States Patent
Changdar et al.

(10) Patent No.: US 6,879,764 B2
(45) Date of Patent: Apr. 12, 2005

(54) DISPERSION SHIFTED FIBER HAVING LOW DISPERSION SLOPE

(75) Inventors: Samaresh Changdar, Banglore (IN); Sthitadhi Das, Nagar Uttar Par Desh (IN)

(73) Assignee: Sterlite Optical Technologies Limited, Aurangabad (IN)

( * ) Notice: Subject to any disclaimer, the term of this patent is extended or adjusted under 35 U.S.C. 154(b) by 0 days.

(21) Appl. No.: 10/476,502
(22) PCT Filed: Apr. 26, 2002
(86) PCT No.: PCT/IN02/00115
§ 371 (c)(1), (2), (4) Date: May 17, 2004
(87) PCT Pub. No.: WO02/088803
PCT Pub. Date: Nov. 7, 2002

(65) Prior Publication Data
US 2004/0197063 A1 Oct. 7, 2004

(30) Foreign Application Priority Data
Apr. 30, 2001 (IN) .................... 412/MUM/2001

(51) Int. Cl.$^7$ ............... G02B 6/02; G02B 6/16; G02B 6/36
(52) U.S. Cl. ............ 385/127; 385/123; 385/129; 385/147
(58) Field of Search ............ 385/123–127, 385/129–132, 147

(56) References Cited
U.S. PATENT DOCUMENTS

| | | | |
|---|---|---|---|
| 4,852,968 A | 8/1989 | Reed | |
| 5,361,319 A | * 11/1994 | Antos et al. | 385/123 |
| 6,134,367 A | 10/2000 | Jones et al. | |
| 6,477,306 B1 | * 11/2002 | Kato et al. | 385/123 |
| 2001/0033724 A1 | * 10/2001 | Kato et al. | 385/123 |

FOREIGN PATENT DOCUMENTS

| | | |
|---|---|---|
| EP | 1 004 905 A | 5/2000 |
| FR | 2 782 392 A | 2/2000 |
| JP | 928820 | 2/1998 |
| JP | 10010350 | 4/1998 |

* cited by examiner

Primary Examiner—Akm Enayet Ullah
(74) Attorney, Agent, or Firm—James Ray & Associates (57) ABSTRACT

Dispersion shifted fiber having low dispersion slope comprising a center core, two claddings, a ring core and the outer glass region, wherein the first cladding is provided onto the outer periphery of the center core, the second cladding is provided onto outer periphery of the first cladding and the ring core is provided onto outer periphery of the second cladding, and the outer glass region surrounds the ring core, and the center core and the ring core have higher refractive indices, and the claddings have lower refractive indices than the outer glass region, and the refractive indices are constrained by the equation $n_1 > n_4 > n_5 > n_2 > n_3$. In accordance with preferred embodiment the fiber comprises of a center core, two claddings, two ring cores, and an outer glass region, wherein the first cladding is provided onto the outer periphery of the center core, the second cladding 3 is provided onto the outer periphery of the first cladding, the first ring core is provided onto the outer periphery of the second cladding, the second ring core 5 is provided onto the outer periphery of the first ring core and the outer glass region surrounds the second ring core, and the refractive indices are constrained by the equation $n_1 > n_4 > n_5 > n_6 > n_2 > n_3$.

15 Claims, 7 Drawing Sheets

DISPERSION SHIFTED FIBER HAVING LOW DISPERSION SLOPE

TECHNICAL FIELD OF THE INVENTION

The present invention relates to dispersion shifted fiber having low dispersion slope, particularly it relates to dispersion optimized fiber having low dispersion slope between 1530 to 1565 nm (C-band) and 1565 to 1625 nm (L-band) transmissions. More particularly it relates to single mode dispersion optimized fiber, which is suitable for transmission of higher bandwidth over longer distance with more uniform chromatic dispersion over the third and fourth window and yet has optimized mode field diameter to achieve low bending induced loss at 1550 nm and at the more critical 1600 nm wavelength.

BACKGROUND ART OF THE INVENTION

Over the last decade, the optical fibers have been developed and installed as the backbone of interoffice networks for voice, video and data transmission. These are becoming important with growing and expanding telecommunication infrastructure. Their importance is further increasing because of their high bandwidth applicability. The higher bandwidth demand is further increasing exponentially with time because of rapid growth of information technology.

The capacity of lightwave communication systems has undergone enormous growth during the last decade. The growing bandwidth demand can be met by using a dense wavelength division multiplexing, hereinafter referred to as DWDM, approach with low dispersion fibers. The requirements of fiber have had to change to support these advances, especially the requirement for the amount and uniformity (slope) of chromatic dispersion across these wavelengths. The DWDM approach enhances the effective data rate of an optical fiber link by, increasing the number of wavelength channels within the wavelength band.

Conventionally, the multi-mode fiber at wavelength of 850 nm were used, which were replaced by single mode fibers with zero dispersion wavelength near 1310 nm. The single mode or monomode optical fibers have greater bandwidth than that of the multimode fibers.

Therefore, the research has been directed towards the development of the single mode fibers, as these fibers were observed to have lower attenuation between the wavelength range from 1300 nm to 1550 nm.

However, when single wavelength moved through 1550 nm window for lower attenuation, the single mode fibers were observed to have very high dispersion.

The major disadvantage of the single mode fibers with high dispersion at 1550 nm was that, it obstructed higher bit rate transmission. This disadvantage of single mode fibers has been overcome by the improved single mode fibers, known as dispersion shifted fibers, which have zero dispersion even when the wavelength shifted to 1550 nm.

The theoretical analysis reveals that a single mode fiber having Low dispersion and low dispersion slope with higher effective area is most desirable for high capacity DWDM, as referred hereinabove, transmission. However, the dispersion shifted fibers used for long distance systems in the prior art have higher dispersion which promotes poor DWDM performance. The dispersion flattened fiber which specify the dispersion magnitude less than 2 ps/nm.km between 1.3 to 1.6 μm have zero dispersion region within the DWDM window. This result is strong four wave mixing, which prevents good DWDM performance.

Ideally the dispersion of an optical fiber should have a constant value over the entire wavelength-operating region. However, the dispersion of fibers varies with the wavelength as the refractive index varies with the wavelength. Their dispersion slope $S_0$ quantifies this variability. The smaller the slope the less the dispersion varies with the wavelength. Another advantage of the low dispersion and low dispersion slope fiber is that its small dispersion allows its minimum dispersion to be increased to better suppress the Four Wave Mixing non-linearity, while still keeping the fiber minimum dispersion small enough for the signals to travel to longer distances with minimum need for dispersion and dispersion slope compensation.

Figure 1:
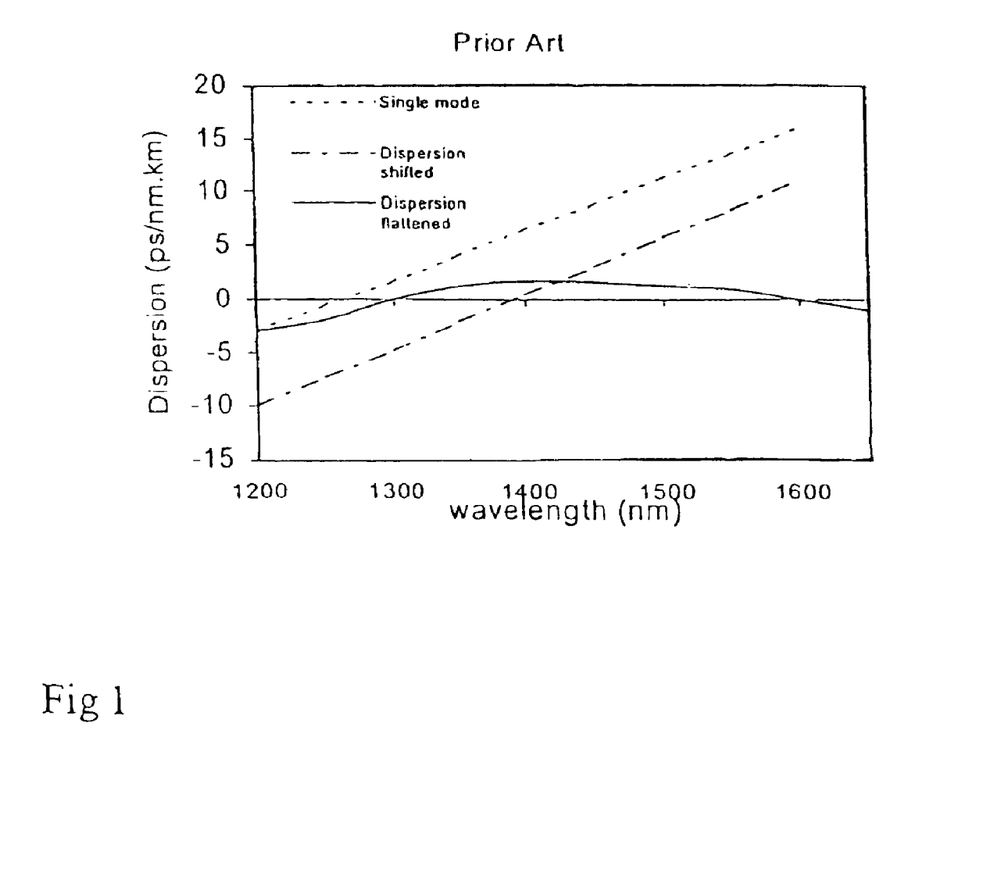
FIG. 1 shows the prior art of the chromatic dispersion of dispersion shifted fiber along with its material and waveguide components.

The prior art of the chromatic dispersion fiber has been illustrated in FIG. 1. It is a result of material and the waveguide dispersion. In the theoretical treatments of intramodal dispersion it is assumed, for simplicity, that the material and the waveguide dispersion can be calculated separately and then added to give the total dispersion of the mode. In reality these two mechanisms are intrinsically related, since the dispersive properties of the refractive index, which gives rise to material dispersion, also affect the waveguide dispersion. Material dispersion occurs because the index refraction varies as a function of the optical wavelength. On the other way waveguide dispersion is a function of the refractive index profile shape.

The parameters, like refractive index and radius of each part of the fibre, like centre core, cladding(s), ring core(s) and outer core, and the relationship between refractive index and radius of such parts of the fibre, and number of cores and claddings decide the characteristic properties of thus obtained fiber and the applications of thus obtained fiber.

Therefore, the fibers known in the art are distinguished by way of their characteristic properties, which in-turn are decided by various parameters as stated herein above. The fibers as known in the prior art either have low non-linearity but high bend loss or have low bend loss but less effective area or may have higher non-linearity and higher bend loss or may have non-uniform chromatic dispersion over the third and fourth window or high dispersion slope, that is the fibre will not have optimum characteristic properties and will sacrifice one of the property for achieving another property.

It has been observed that the dispersion and dispersion slope varies with the wavelength and refractive index varies with the wavelength.

Therefore, in view of variation of dispersion and dispersion slope with the wavelength and variation of refractive index with the wavelength constant efforts are being made to develop optical fibers which have optimum dispersion and dispersion slope and yet having such a refractive index profile and the configuration which is easy to be achieved and accordingly it is easy to fabricate the desired fiber which is suitable in as wider range of the wavelength as possible.

Therefore, the inventors of the present invention have made an attempt to develop the fiber, which will have optimum characteristic properties, that is which will not sacrifice one of the characteristic property to achieve another characteristic property.

NEED OF THE INVENTION

Therefore, there is a need to develop dispersion shifted fiber, particularly single mode dispersion optimized fiber having as far as possible optimum low dispersion slope between 1530 to 1565 nm (C-band) and 1565 to 1625 nm (L-band) transmissions, more particularly to develop a fiber which is suitable for transmission of higher bandwidth over longer distance with more uniform chromatic dispersion over the third and fourth window and yet has optimized mode field diameter to achieve low bending induced loss at 1550 nm and at the more critical 1600 nm wavelength.

OBJECTS OF THE INVENTION

The main object of the present invention is to make a complete disclosure of two fibers, which have low dispersion slope particularly between 1530 to 1565 nm (C-band) and 1565 to 1625 nm (L-band) regions.

Another object of the present invention is to make a complete disclosure of two fibers which have low dispersion slope and are suitable for long haul transmission.

Still another object of the present invention is to make a complete disclosure of two fibers which have low dispersion and optical loss between 1530 to 1565 nm (C-band) and 1565 to 1625 nm (L-band) wavelength bands but also have as far as possible optimized effective area, cut-off wavelength and mode field diameter.

Yet another object of the present invention is to make a complete disclosure of two fibers, which not only have high level of bend resistance but also have minimized non-linearities with optimum chromatic dispersion.

NATURE AND BRIEF DESCRIPTION OF THE INVENTION

In accordance with theoretical analysis carried out by the inventors, it appears that the main drawbacks and limitations of the prior art can be overcome by a fiber, which has chromatic dispersion between about 2.6 to 6.0 ps/nm.km and about 3.9 to 8.6 ps/nm.km over the operating wavelength 1530 to 1565 nm (C-band) and of 1565 to 1625 nm (L-band) respectively and maximum dispersion slope less than about 0.05 ps/nm$^2$.km over the said wavelength regions. Therefore, in the present invention an attempt has been made to develop a fiber having such a refractive index profile and configuration which is not only easy to be achieved but also easy to be fabricated, wherein said fiber will have chromatic dispersion and dispersion slope characteristics in or closer to said ranges or values.

In accordance with the present invention a dispersion shifted fiber having low dispersion slope between 1530 to 1565 nm (C-band) and 1565 to 1625 nm (L-band) transmissions, particularly a single mode dispersion optimized fiber, which is suitable for transmission of higher bandwidth over longer distance with more uniform chromatic dispersion over the third and fourth window and yet has optimized mode field diameter to achieve low bending induced loss at 1550 nm and at the more critical 1600 nm wavelength is disclosed comprising a centre core, two claddings, a ring core and the outer glass region, wherein first cladding is provided onto the outer periphery of the centre core, second cladding is provided onto outer periphery of the first cladding and the ring core is provided onto outer periphery of the second cladding, and the outer glass region surrounds the ring core.

According to the present invention the refractive indices of various regions of the presently disclosed fibre are related in a manner that the centre core and the ring core have higher refractive indices, and the claddings have lower refractive indices than that of the outer glass region and are so selected that dispersion and chromatic dispersion slope are low and the bend loss during C- and L-band transmissions is also low. The radii of each of the said parts are also so selected that the dispersion and chromatic dispersion slope, and the bend loss during C- and L-band transmissions are in the desired range.

The other preferred embodiments and the advantages of the present invention will be more apparent from the following description when it is read in conjunction with the accompanying figures which are not intended to limit the scope of the present invention.

BRIEF DESCRIPTION OF THE ACCOMPANYING FIGURES

The nature of the present invention is described with the help of accompanying figures, which are incorporated with a view to demonstrate the invention and its best mode of operation of the present invention. The present invention is however, limited by the relation of refractive indices and their respective values and/or by radii of various parts of the disclosed fiber as elaborated in the following description.

DETAILED DISCLOSURE OF THE INVENTION

Figure 2A:
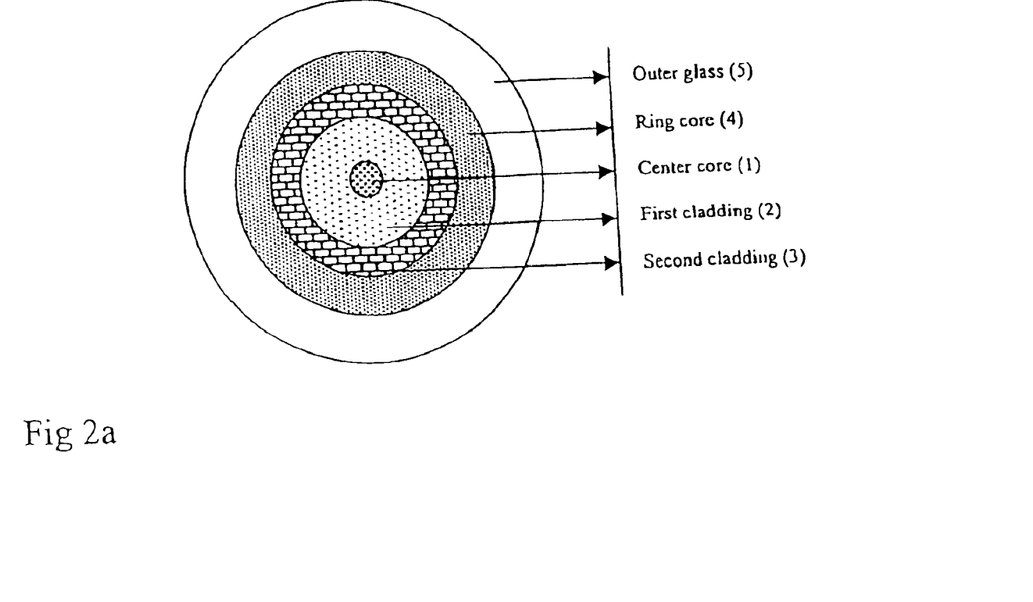
FIG. 2a shows a cut section of the optical fiber in accordance to the present invention.

In accordance with the present invention a disclosed optical fiber, shown in FIG. 2a, comprises of a centre core 1, two claddings 2 and 3, a ring core 4 and the outer glass region 5, wherein first cladding 2 is provided onto the outer periphery of the centre core 1, second cladding 3 is provided onto outer periphery of the first cladding 2 and the ring core 4 is provided onto outer periphery of the second cladding 3, and the outer glass region 5 surrounds the ring core 4 [FIG. 2a].

Figure 2B:
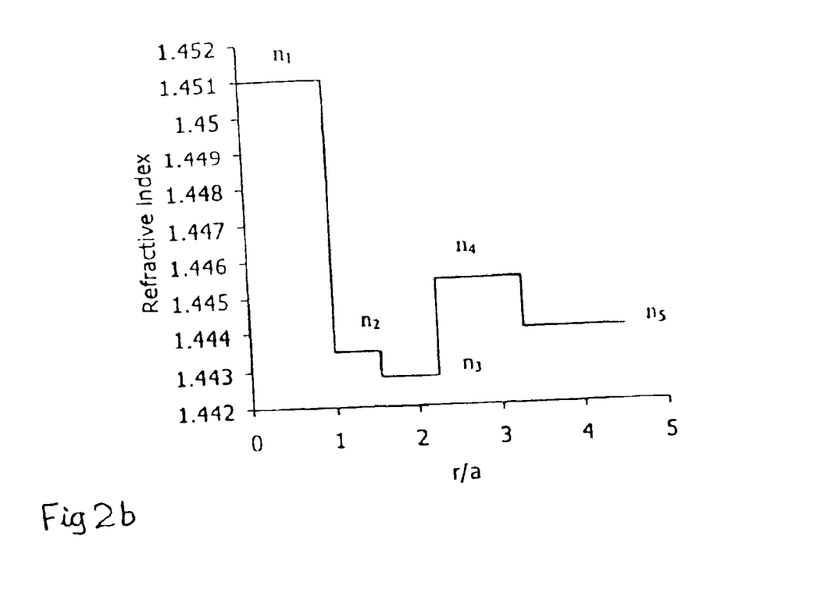
FIG. 2b shows the refractive index profile of the optical fiber shown in FIG. 2a in accordance to the present invention.

According to this invention the centre core 1 and ring core 4 of the presently disclosed optical fiber have higher refractive indices, and the claddings 2 and 3 have lower refractive indices than that of the outer glass region 5 [FIG. 2b]. The refractive index of the centre core 1, first cladding 2, second cladding 3, ring core 4 and outer glass region 5 are identified by symbols $n_1$, $n_2$, $n_3$, $n_4$ and $n_5$ respectively and in accordance with the present invention, these refractive indices are so selected that dispersion and chromatic dispersion slope are low and the bend loss during C- and L-band transmissions is also low, and according to the present invention these refractive indices and their values are constrained by the following equations:

$$n_1 > n_4 > n_5 > n_2 > n_3$$

$$0.008 > (n_1 - n_5) > 0.0075$$

$$0.0015 > (n_4 - n_5) > 0.0012$$

$$-0.001 < (n_2 - n_5) < -0.0006$$

$$-0.0015 < (n_3 - n_5) < -0.0008$$

The optical fiber disclosed herein above and illustrated in accompanied FIGS. 2a and 2b is insensitive to microbend loss and dispersion slope no more than 0.05 ps/nm².km.

In a specific embodiment of the present invention the optical fiber shown in FIG. 2a has:

$$n_1 - n_5 = \text{about } 0.007$$

$$n_4 - n_5 = \text{about } 0.0014$$

$$n_2 - n_5 = \text{about } -0.0005$$

$$n_3 - n_5 = \text{about } -0.0012$$

The presently disclosed optical fiber of FIG. 2a is also identified by the radius of each of the said parts, that is of the centre core 1, first cladding 2, second cladding 3 and a ring core 4, wherein the radius of centre core 1, first cladding 2, second cladding 3 and ring core 4 are identified by symbols $a_1$, $a_2$, $a_3$ and $a_4$ respectively and in accordance with the present invention, these radii are so selected that the dispersion and chromatic dispersion slope, and the bend loss during C- and L-band transmissions are in the desired range, and according to the present invention these radii are restricted by the following equations:

$$a_1 = \text{about } 2.8 \; \mu m$$

$$a_2 = \text{about } 4.3 \; \mu m$$

$$a_3 = \text{about } 6.3 \; \mu m$$

$$a_4 = \text{about } 9.2 \; \mu m$$

Figure 3A:
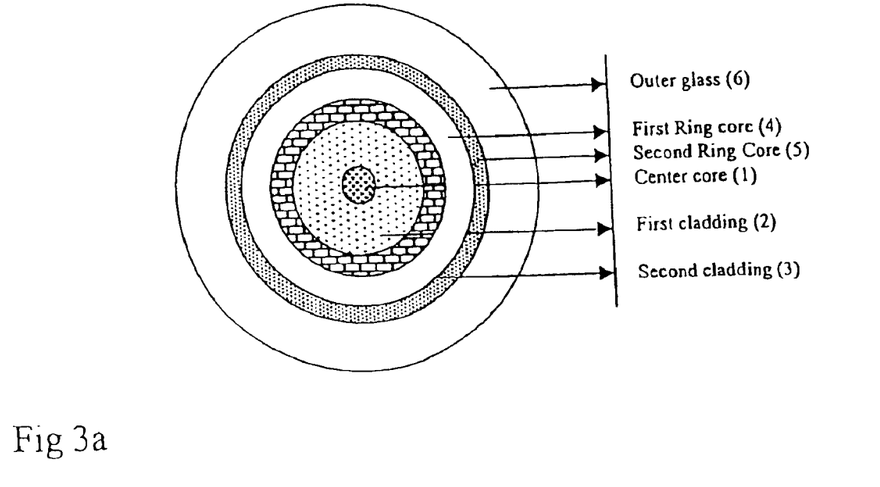
FIG. 3a shows a cut section of the optical fiber in accordance to the preferred embodiment of the present invention.
Figure 3B:
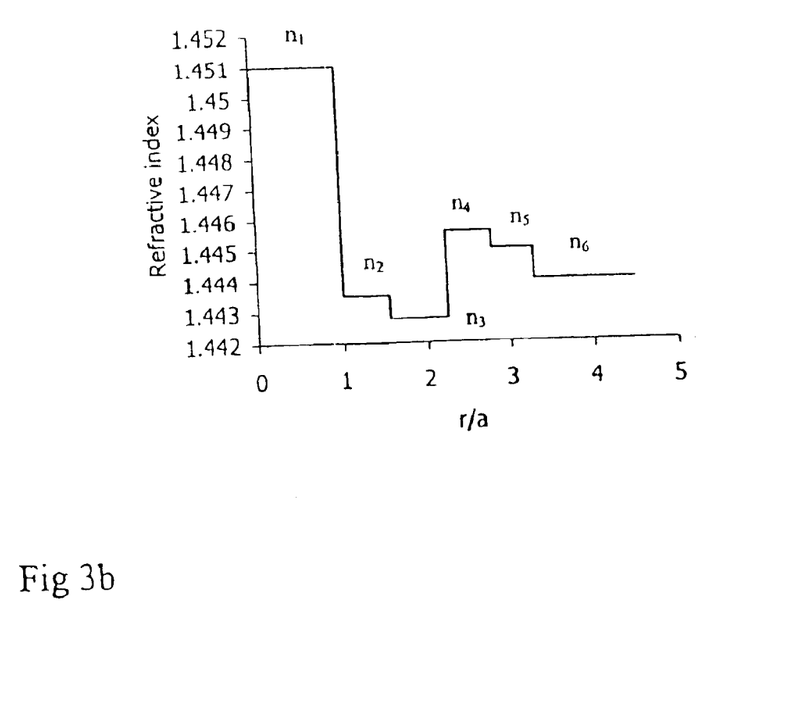
FIG. 3b shows the refractive index profile of the optical fiber shown in FIG. 3a in accordance to the preferred embodiment of the present invention.

In accordance to the preferred embodiment of the present invention the optical fiber [FIG. 3a] comprises a centre core 1, two claddings 2 and 3, two ring cores 4 and 5, and an outer glass region 6, wherein first, cladding 2 is provided onto the outer periphery of the centre core 1, second cladding 3 is provided onto the outer periphery of the first cladding 2, first ring core 4 is provided onto the outer periphery of the second cladding 3, second ring core 5 is provided onto the outer periphery of the first ring core 4 and outer glass region 6 surrounds the second ring core 5.

According to the preferred embodiment of the present invention the refractive indices of centre core 1, first cladding 2, second cladding 3, first ring core 4, second ring core 5 and an outer glass region 6 of the optical fiber [FIG. 3a] are identified by $n_1$, $n_2$, $n_3$, $n_4$, $n_5$ and $n_6$ respectively and in accordance with the preferred embodiment of the present invention, these refractive indices are so selected that dispersion and chromatic dispersion slope are low and the bend loss during C- and L-band transmissions is also low and are in desired range, and according to the present invention these refractive indices and their values are constrained by the following equations:

$$n_1 > n_4 > n_5 > n_6 > n_2 > n_3$$

$$0.008 > (n_1 - n_6) > 0.0075$$

$$0.0016 > (n_4 - n_6) > 0.0012$$

$$0.0012 > (n_5 - n_6) > 0.0010$$

$$-0.001 < (n_2 - n_6) < -0.0006$$

$$-0.0015 < (n_3 - n_6) < -0.0008$$

In a specific embodiment of the present invention the optical fiber shown in FIG. 3a has:

$$n_1 - n_6 = \text{about } 0.0071$$

$$n_4 - n_6 = \text{about } 0.0015$$

$$n_5 - n_6 = \text{about } 0.0013$$

$$n_2 - n_6 = \text{about } -0.0005$$

$$n_3 - n_6 = \text{about } -0.0012$$

The presently disclosed optical fiber of FIG. 3a is also identified by the radius of each of the said parts, that is of the centre core 1, first cladding 2, second cladding 3, first ring core 4 and second ring core 5, wherein the radius of centre core 1, first cladding 2, second cladding 3, first ring core 4 and second ring core 5 are identified by symbols $a_1$, $a_2$, $a_3$, $a_4$ and $a_5$ respectively and in accordance with the present invention, these radii are so selected that the dispersion and chromatic dispersion slope, and the bend loss during C- and L-band transmissions are in the desired range, and according to the present invention these radii are restricted by the following equations:

$$a_1 = \text{about } 2.8 \; \mu m,$$

$$a_2 = \text{about } 4.3 \; \mu m,$$

$$a_3 = \text{about } 6.3 \; \mu m,$$

$$a_4 = \text{about } 8.0 \; \mu m,$$

$$a_5 = \text{about } 9.2 \; \mu m$$

In one illustrative embodiment of the present invention the refractive index profile of the optical fiber shown in FIG. 2a comprises two single annular rings 2 and 3 of germanium and flourine doped material between a germanium doped centre core 1 and ring core 4. The outer glass region 5 is provided onto the outer periphery of the germanium doped ring core 4.

In accordance with the present invention the optical fiber shown in FIG. 2a having a refractive index profile and relative radius of each of the said part as disclosed hereinabove has been identified having following characteristics:

| | |
|---|---|
| Attenuation | about $\leq 0.22$ |
| Dispersion at 1530 to 1565 nm | about 2.5 to 6.0 ps/nm.km |
| Dispersion at 1565 to 1625 nm | about 3.9 to 8.6 ps/nm.km |
| Dispersion slope | about $\leq 0.05$ ps/nm².km |
| Polarization Mode Dispersion (PMD) | about $\leq 0.08$ ps/km$^{0.5}$ |
| Mode Field Diameter (MFD) | about $8.3 \pm 0.6 \; \mu m$ |
| Cut off wavelength | about $\leq 1280$ nm |

-continued

| | |
|---|---|
| Core concentricity | about ≦0.6 μm |
| Cladding diameter | about 125 ± 1 |
| Microbending | about ≦0.05 dB at 1550 nm |
| Macrobending | about ≦0.5 dB at 1550 nm |
| Proof test | about 100 kpsi |

In one illustrative embodiment of the present invention the refractive index profile of the optical fiber shown in FIG. 3a comprises two single annular rings 2 and 3 of germanium and fluorine doped material between a germanium doped centre core 1 and ring core 4. The germanium doped second ring core 5 is provided onto the outer periphery of the first ring core 4. The outer glass region 6 is provided onto the outer periphery of the germanium doped second ring core 5.

In accordance with the present invention the optical fiber shown in FIG. 3a having a refractive index profile and relative radius of each of the said part as disclosed hereinabove has been identified having following characteristics:

| | |
|---|---|
| Attenuation | about ≦0.22 |
| Dispersion at 1530 to 1565 nm | about 1 to 6.0 ps/nm.km |
| Dispersion at 1565 to 1625 nm | about 4 to 8.6 ps/nm.km |
| Dispersion slope | about ≦0.05 ps/nm².km |
| Polarization Mode Dispersion (PMD) | about ≦0.08 ps/km$^{0.5}$ |
| Mode Field Diameter (MFD) | about 8.3 ± 0.6 μm |
| Cut off wavelength | about ≦1450 nm |
| Core concentricity | about ≦0.6 μm |
| Cladding diameter | about 125 ± 1 |
| Microbending | about ≦0.05 dB at 1550 nm |
| Macrobending | about ≦0.5 dB at 1550 nm |
| Proof test | about 100 kpsi |

Figure 4:
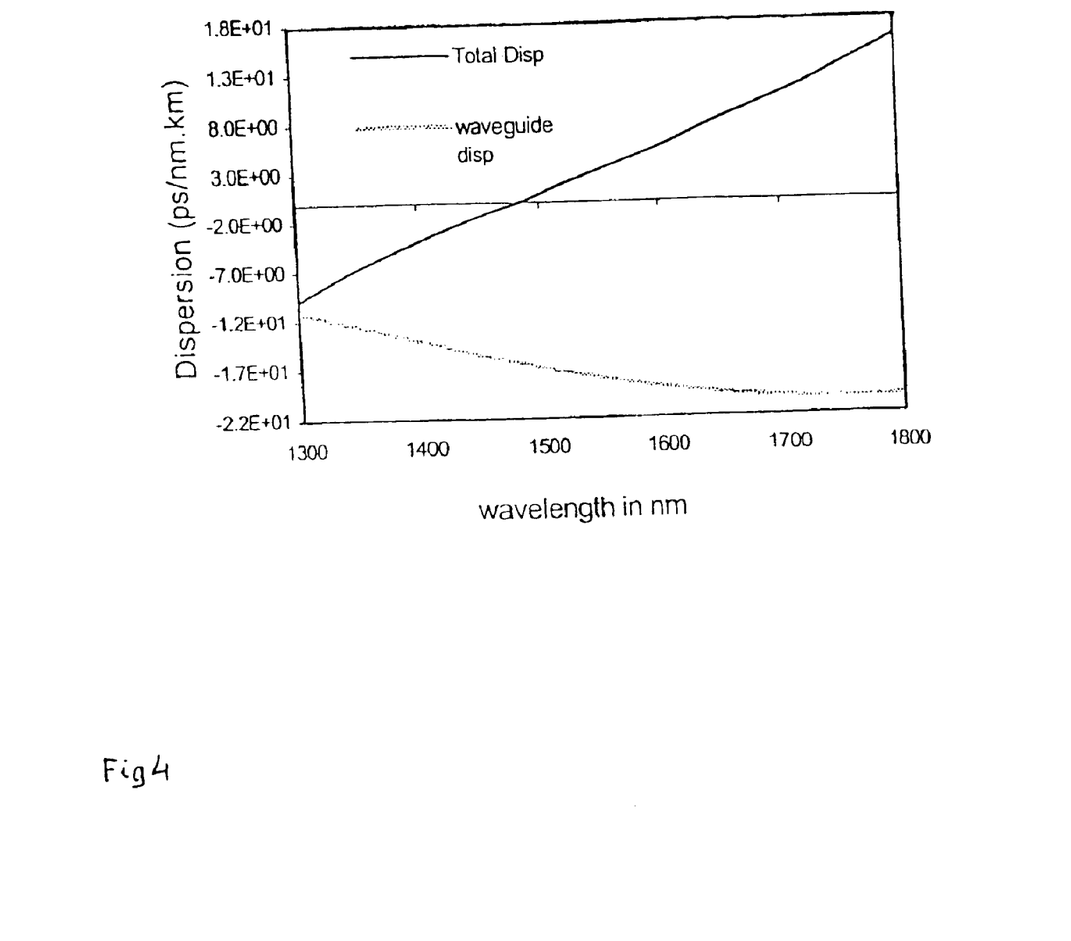
FIG. 4 shows the chromatic dispersion along with waveguide dispersion of the optical fiber shown in FIG. 2a in accordance to the present invention.

In accordance to the present invention, FIG. 4 discloses the chromatic dispersion characteristics of the optical fiber shown in FIG. 2a. It also shows how waveguide dispersion controls the low dispersion and low dispersion slope of the fiber.

The waveguide dispersion is given by the following equation $$\frac{n_2 \Delta}{c} \frac{1}{\lambda} \left[ V \frac{d^2(Vb)}{dV^2} \right]$$

wherein λ is the wavelength of the light, b is the normalized propagation constant and c is the velocity of the light. The broken curve of FIG. 4 represents the waveguide dispersion characteristics of the fiber with $n_1-n_5=0.007$, $n_4-n_5=0.0014$, $n_2-n_5=-0.0005$, $n_3-n_5=-0.0012$, $a_1=2.8$ μm, $a_2=4.3$ μm, $a_3=6.3$ μm, $a_4=9.2$ μm in accordance to the present invention.

Figure 5:
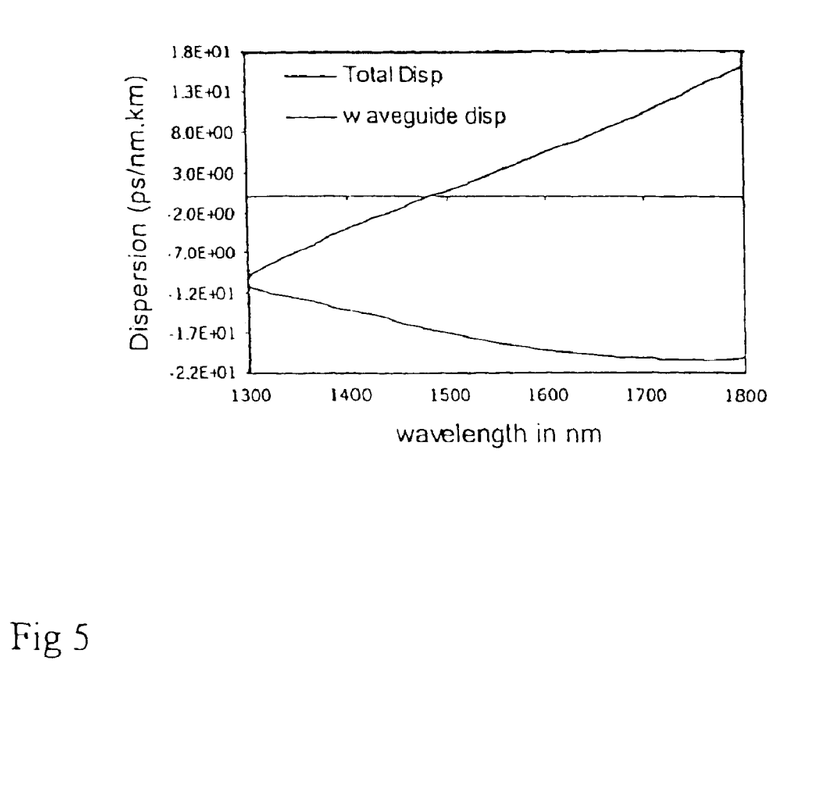
FIG. 5 shows the chromatic dispersion along with waveguide dispersion of the optical fiber shown in FIG. 3a in accordance to the preferred embodiment of the present invention.

In accordance to the preferred embodiment of the present invention, FIG. 5 discloses the chromatic dispersion characteristics of the optical fiber shown in FIG. 3a. It shows how waveguide dispersion controls the low dispersion and low dispersion slope of the said fiber.

The modal field extends far into the cladding for the optical fiber and its preferred embodiment. Thus Mode Field Diameter (MFD) is very different from core diameter.

Figure 6:
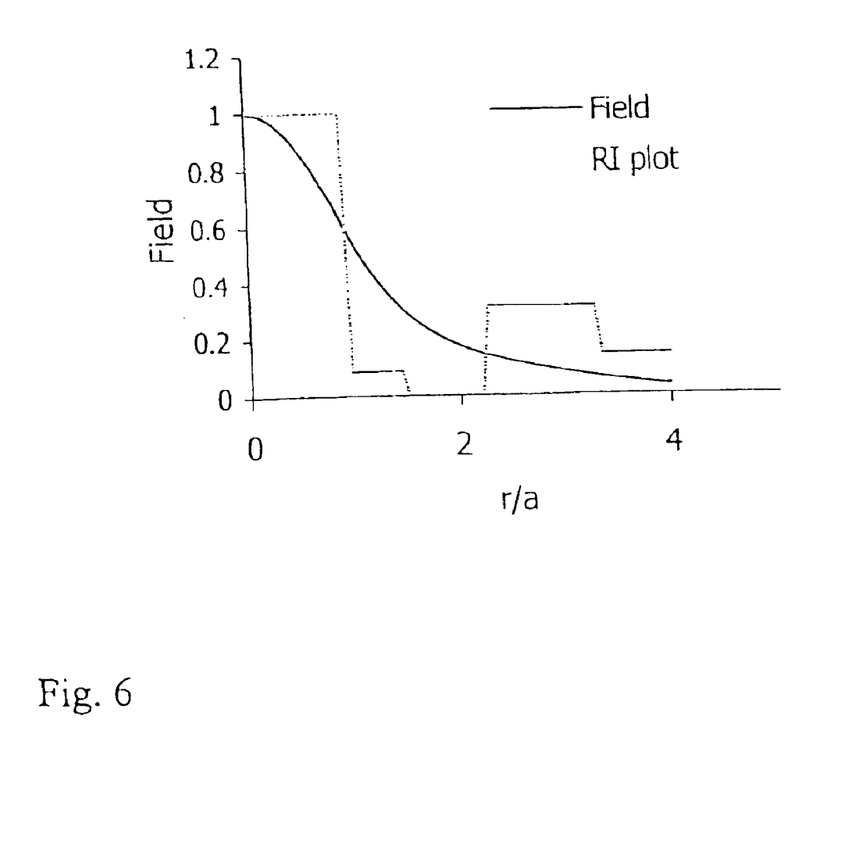
FIG. 6 shows the intensity distribution along the diameter of the presently disclosed optical fiber shown in FIG. 2a in accordance to the present invention.

FIG. 6 discloses the intensity field distribution, overlapped on the refractive index profile of the optical fiber shown in FIG. 2a, across the diameter of the fiber.

Figure 7:
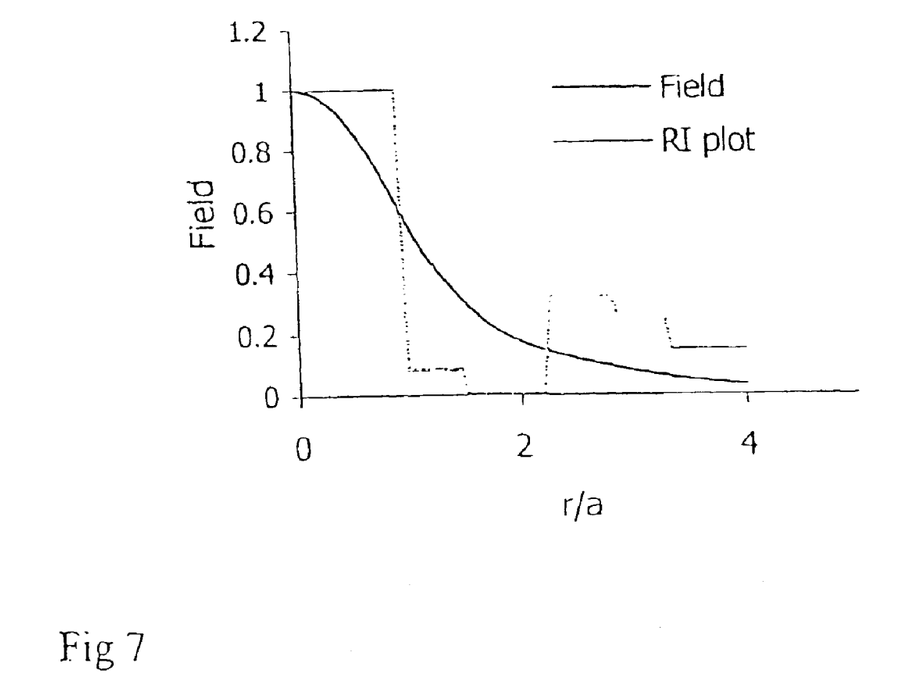
FIG. 7 shows the intensity distribution along the diameter of the presently disclosed optical fiber shown in FIG. 3a in accordance to the preferred embodiment of the present invention.

FIG. 7 discloses the details regarding intensity distribution characteristics of the optical fiber shown in FIG. 3a in accordance to the preferred embodiment of the present invention.

What is claimed is:

1. Dispersion shifted fiber having low dispersion slope of about ≦0.05 ps/nm².km comprising a centre core, two claddings, a ring core and an outer glass region, wherein a first cladding of said two claddings is provided onto said outer periphery of said centre core, a second cladding of said two claddings is provided onto an outer periphery of said first cladding and said ring core is provided onto an outer periphery of said second cladding, and said outer glass region surrounds said ring core characterized in that said centre core and said ring core have higher refractive indices, and said claddings have lower refractive indices than said outer glass region; and the refractive indices are constrained by the following equation:

$n_1 > n_4 > n_5 > n_2 > n_3$, and values of their refractive indices are constrained by the following equations:

$0.008 > (n_1 - n_5) > 0.0075$ $0.0015 > (n_4 - n_5) > 0.0012$ $-0.001 < (n_2 - n_5) < -0.0006$ $-0.0015 < (n_3 - n_5) < -0.0008$ wherein $n_1$, $n_2$ $n_3$, $n_4$ and $n_5$ represent the refractive index of said centre core, said first cladding, said second cladding, said ring core and said outer glass region respectively; and the radius of said members of the fibre are restricted by the following equations:

$a_1$=about 2.8 μm $a_2$=about 4.3 μm $a_3$=about 6.3 μm $a_4$=about 9.2 μm wherein $a_1$, $a_2$, $a_3$, and $a_4$ represents radius of said centre core, said first cladding, said second cladding and said ring core respectively.

2. Dispersion shifted fiber according to claim 1, wherein said values of refractive indices of said members of said fibre are constrained by the following equations:

$n_1 - n_5$=about 0.007

$n_4 - n_5$=about 0.0014

$n_2 - n_5$=about -0.0005

$n_3 - n_5$=about -0.0012.

3. Dispersion shifted fiber according to claim 1, comprising a centre core, two claddings, two ring cores, and an outer glass region, wherein said first cladding is provided onto said outer periphery of said center core, said second cladding is provided onto said outer periphery of said first cladding, a first ring core of said two ring cores is provided onto said outer periphery of said second cladding, a second ring core of said two ring cores is provided onto an outer periphery of said first ring core and said outer glass region surrounds said second ring core characterized in that the refractive indices are ring core characterized in that the refractive indices are constrained by the following equation:

$n_1 > n_4 > n_5 > n_6 > n_2 > n_3$ and values of their refractive indices are constrained by the following equations:

$$0.008 > (n_1 - n_6) > 0.0075$$

$$0.0016 > (n_4 - n_6) > 0.0012$$

$$0.0012 > (n_5 - n_6) > 0.0010$$

$$-0.001 < (n_2 - n_6) < -0.0006$$

$$-0.0015 < (n_3 - n_6) < -0.0008$$

wherein $n_2$, $n_3$, $n_4$, $n_5$ and $n_6$ represent refractive index of said centre core, said first cladding, said second cladding, said first ring core, said second ring core and said outer glass region respectively;

the radius of said members of the fibre are restricted by the following equations:

$$a_1 = \text{about } 2.8 \ \mu m$$

$$a_2 = \text{about } 4.3 \ \mu m$$

$$a_3 = \text{about } 6.3 \ \mu m,$$

$$a_4 = \text{about } 8.0 \ \mu m$$

$$a_5 = \text{about } 9.2 \ \mu m$$

wherein $a_1$, $a_2$, $a_3$, $a_4$ and $a_5$ represent radius of said centre core, said first cladding, said second cladding, said first ring core and said second ring core respectively.

4. Dispersion shifted fiber according to claim 3, wherein said values of the refractive indices of said members of said fibre are constrained by the following equations:

$$n_1 - n_6 = \text{about } 0.0071$$

$$n_4 - n_6 = \text{about } 0.0015$$

$$n_5 - n_6 = \text{about } 0.0013$$

$$n_2 - n_6 = \text{about } -0.0005$$

$$n_3 - n_6 = \text{about } -0.0012.$$

5. Dispersion shifted fiber according to claim 1, wherein a refractive index profile comprises two single annular rings of germanium and fluorine doped material between a germanium doped centre core and ring core.

6. Dispersion shifted fiber according to claim 1, wherein attenuation of said fibre is about $\leq 0.22$, polarization mode dispersion (PMD) is about $\leq 0.08$ ps/km$^{0.5}$, mode field diameter (MFD) is about $8.3 \pm 0.6 \ \mu m$ and cut off wavelength is about $<1280$ nm.

7. Dispersion shifted fiber according to claim 1 wherein dispersion of said fibre at 1530 to 1565 nm is about 2.5 to 6.0 ps/nm.km and at 1565 to 1625 nm is about 3.9 to 8.6 ps/nm.km.

8. Dispersion shifted fiber according to claim 1, wherein core concentricity of said fibre is about $\leq 0.6 \ \mu m$ and cladding diameter is about $125 \pm 1$.

9. Dispersion shifted fiber according to claim 1, wherein microbending of said fibre is about $\leq 0.05$ dB at 1550 nm and macrobending is about $\leq 0.5$ dB at 1550 nm.

10. Dispersion shifted fiber according to claim 3, wherein a refractive index profile of said fiber comprises two single annular rings and of germanium and fluorine doped material between a germanium doped centre core and ring core.

11. Dispersion shifted fiber according to claim 3, wherein attenuation of said fibre is about $\leq 0.22$, polarization mode dispersion (PMD) is about $\leq 0.08$ ps/km$^{0.5}$, mode field diameter (MFD) is about $8.3 \pm 0.6 \ \mu m$ and cut off wavelength is about $\leq 1450$ nm.

12. Dispersion shifted fiber according to claim 3, wherein Dispersion of said fibre at 1530 to 1565 nm is about 1 to 6.0 ps/nm.km and at 1565 to 1625 nm is about 4 to 8.6 ps/nm.km.

13. Dispersion shifted fiber according to claim 3, wherein Dispersion slope of said fibre is about $\leq 0.05$ ps/nm$^2$.km.

14. Dispersion shifted fiber according to claim 3, wherein core concentricity of said fibre is about $\leq 0.6 \ \mu m$ and cladding diameter is about $125 \pm 1$.

15. Dispersion shifted fiber according to claim 3, wherein microbending of said fibre is about $\pm 0.05$ dB at 1550 nm and macrobending is about $\leq 0.5$ dB at 1550 nm.

* * * * *